US012198712B2

(12) United States Patent
Zhang et al.

(10) Patent No.: US 12,198,712 B2
(45) Date of Patent: Jan. 14, 2025

(54) SPEECH SIGNAL PROCESSING METHOD AND APPARATUS

(71) Applicant: HONOR DEVICE CO., LTD., Guangdong (CN)

(72) Inventors: Xianchun Zhang, Shenzhen (CN); Jinyun Zhong, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 295 days.

(21) Appl. No.: 17/788,758

(22) PCT Filed: Nov. 9, 2020

(86) PCT No.: PCT/CN2020/127546
§ 371 (c)(1),
(2) Date: Jun. 24, 2022

(87) PCT Pub. No.: WO2021/129196
PCT Pub. Date: Jul. 1, 2021

(65) Prior Publication Data

US 2023/0024984 A1 Jan. 26, 2023

(30) Foreign Application Priority Data

Dec. 25, 2019 (CN) ......................... 201911359322.4

(51) Int. Cl.

| | |
|---|---|
| ***G10L 21/034*** | (2013.01) |
| ***G10L 21/0208*** | (2013.01) |
| ***H04R 1/10*** | (2006.01) |

(52) U.S. Cl.
CPC ........ *G10L 21/034* (2013.01); *G10L 21/0208* (2013.01); *H04R 1/10* (2013.01); *H04R 1/1083* (2013.01); *G10L 2021/02082* (2013.01)

(58) Field of Classification Search
USPC ...................................................... 704/1–504
See application file for complete search history.

(56) References Cited

U.S. PATENT DOCUMENTS 9,467,769 B2 * 10/2016 Liu ........................ H04R 3/005
9,843,859 B2 * 12/2017 Tan ....................... H04R 1/1016
(Continued)

FOREIGN PATENT DOCUMENTS

CN 103269465 A 8/2013
CN 204887366 U 12/2015
(Continued)

*Primary Examiner* — Marcus T Riley
(74) *Attorney, Agent, or Firm* — Fish & Richardson P.C.

(57) ABSTRACT

This application provides a speech signal processing method and apparatus, and relates to the field of signal processing technologies and earphone, to monitor an ambient sound signal and improve a monitoring effect and user experience. The method is applied to an earphone, where the earphone includes at least one external speech collector. The method includes: preprocessing a speech signal collected by the at least one external speech collector, to obtain an external speech signal; extracting an ambient sound signal from the external speech signal; and performing audio mixing processing on a first speech signal and the ambient sound signal based on amplitudes and phases of the first speech signal and the ambient sound signal and a location of the at least one external speech collector, to obtain a target speech signal.

20 Claims, 3 Drawing Sheets

(56) References Cited

U.S. PATENT DOCUMENTS

| | | | | |
|---|---|---|---|---|
| 11,328,705 | B2 * | 5/2022 | Hua | H04R 1/1083 |
| 2007/0038442 | A1 * | 2/2007 | Visser | G10L 21/0272<br>704/E21.012 |
| 2008/0267416 | A1 * | 10/2008 | Goldstein | H04R 3/00<br>381/56 |
| 2016/0351203 | A1 * | 12/2016 | Tan | G10L 21/0364 |
| 2018/0167715 | A1 * | 6/2018 | Graylin | G06F 3/165 |
| 2019/0287546 | A1 * | 9/2019 | Ganeshkumar | G10L 21/0208 |
| 2019/0287547 | A1 * | 9/2019 | Furuta | H04R 25/00 |
| 2023/0024984 | A1 * | 1/2023 | Zhang | G10L 21/0208 |

FOREIGN PATENT DOCUMENTS

| | | | | |
|---|---|---|---|---|
| CN | 107919132 | A | 4/2018 | |
| CN | 207560274 | U | 6/2018 | |
| CN | 108322845 | A | 7/2018 | |
| CN | 108810714 | A | 11/2018 | |
| CN | 108847208 | A | 11/2018 | |
| CN | 108847250 | A | 11/2018 | |
| CN | 209002161 | U | 6/2019 | |
| JP | 2018074220 | A | 5/2018 | |
| WO | WO-2023085749 | A1 * | 5/2023 | G10L 19/26 |

* cited by examiner

SPEECH SIGNAL PROCESSING METHOD AND APPARATUS

CROSS-REFERENCE TO RELATED APPLICATIONS

This application is a U.S. National Stage of International Application No. PCT/CN/2020/127546, filed Nov. 9, 2020, which claims priority to Chinese Patent Application No. 201911359322.4, filed on Dec. 25, 2019. Both of the aforementioned applications are hereby incorporated by reference in their entireties.

TECHNICAL FIELD

This application relates to the field of signal processing technologies and earphone, and in particular, to a speech signal processing method and apparatus.

BACKGROUND

To create a better sound listening environment and achieve a better sound effect, various noise reduction technologies are used in an existing earphone to isolate or intelligently cancel another sound in an ambient environment. However, after an ambient sound is isolated, a user can hardly hear a sound in the ambient environment, which also causes many problems to the user. For example, when the user needs to talk with a nearby person, the user needs to take off the earphone to hear the person. For another example, when the user walks outdoors, it is difficult for the user to hear a horn sound of a vehicle. Consequently, a dangerous situation is prone to occur when a vehicle passes by. Therefore, there is a need for an earphone having a function of monitoring an ambient sound.

FIG. 1 is a schematic diagram of an earphone in the prior art. A noise microphone (microphone, MIC) is disposed in the earphone, and is represented as an MIC1 in FIG. 1. When a user wears the earphone, the MIC1 is close to an ear of the user. For the earphone disposed with the MIC1, the following method is usually used in the prior art to monitor an ambient sound: A high-pass filter and a low-pass filter are used to perform filtering processing on a speech signal collected by the MIC1 in an active noise cancellation (active noise cancellation, ANC) chip, so as to reserve a speech signal of a frequency band. Then, the reserved speech signal is optimized by an equalizer (equalizer, EQ) and then output by using a speaker. However, an ambient sound signal monitored by using this method is unnatural, and consequently, a monitoring effect is poor.

SUMMARY

Technical solutions of this application provide a speech signal processing method and apparatus, to monitor an ambient sound signal and improve a monitoring effect and user experience.

According to a first aspect, a technical solution of this application provides a speech signal processing method, applied to an earphone, where the earphone includes at least one external speech collector. The method includes: preprocessing a speech signal collected by the at least one external speech collector, to obtain an external speech signal, where the preprocessing may specifically include related processing used to increase a signal-to-noise ratio of the external speech signal, such as noise reduction, amplitude adjustment, gain enhancement, or other processing; extracting an ambient sound signal from the external speech signal, for example, extracting a whistle sound, a broadcast sound, or a baby crying sound from the external speech signal; and performing audio mixing processing on a first speech signal and the ambient sound signal based on amplitudes and phases of the first speech signal and the ambient sound signal and a location of the at least one external speech collector, to obtain a target speech signal, where the first speech signal may be a to-be-played speech signal such as a song or a broadcast transmitted to the earphone by an electronic device connected to the earphone, or the first speech signal is a speech signal such as a call speech of a user collected by a microphone of the earphone.

In the technical solution, when a user wears the earphone, the external speech collector is located outside an ear canal of the user, so that the external speech signal can be obtained by preprocessing the speech signal collected by the at least one external speech collector. A required ambient sound signal may be obtained by extracting the ambient sound signal from the external speech signal, and audio mixing processing is performed on the first speech signal and the ambient sound signal to obtain the target speech signal. Therefore, when the target speech signal is played, the user may hear a clear and natural first speech signal and important ambient sound signal in an external environment, thereby implementing monitoring of an ambient sound, and improving a monitoring effect and user experience.

In a possible implementation of the first aspect, the performing audio mixing processing on a first speech signal and the ambient sound signal includes: adjusting at least one of the amplitude, the phase, or an output delay of the first speech signal; and/or adjusting at least one of the amplitude, the phase, or an output delay of the ambient sound signal; and mixing an adjusted first speech signal and an adjusted ambient sound signal into one speech signal. In the possible implementation, the first speech signal and the ambient sound signal are adjusted, so that the first speech signal heard by the user is clear and natural, and the ambient sound signal heard by the user does not cause discomfort such as harshness or inaudibility, thereby improving speech signal quality and user experience.

In a possible implementation of the first aspect, the extracting an ambient sound signal from the external speech signal includes, performing coherence processing on the external speech signal and a sample speech signal to obtain the ambient sound signal. The performing coherence processing on the external speech signal and a sample speech signal may include: determining a power-spectrum density of the external speech signal, determining a power-spectrum density of the sample speech signal, and determining a cross-spectrum density between the external speech signal and the sample speech signal; determining a coherence coefficient between the external speech signal and the sample speech signal based on the power-spectrum density and the cross-spectrum density; and further determining the ambient sound signal based on the coherence coefficient. For example, a corresponding speech signal in the external speech signal when the coherence coefficient is equal to or close to 1 may be determined as the ambient sound signal. In the possible implementation, the provided manner for extracting the ambient sound signal has high accuracy, and the obtained ambient sound signal has a high signal-to-noise ratio.

In a possible implementation of the first aspect, the at least one external speech collector includes at least two external speech collectors, and the extracting an ambient sound signal from the external speech signal includes: performing coherence processing on external speech signals corresponding to the at least two external speech collectors, to obtain the ambient sound signal. The external speech signal corresponding to each external speech collector is an external speech signal obtained after a speech signal collected by the external speech collector is preprocessed. In the possible implementation, the provided manner for extracting the ambient sound signal by performing coherence processing has high accuracy, and the obtained ambient sound signal has a high signal-to-noise ratio.

In a possible implementation of the first aspect, the earphone further includes an ear canal speech collector, and the method further includes: preprocessing a speech signal collected by the ear canal speech collector, to obtain the first speech signal. The first speech signal may include only a speech signal of a user (for example, a self-speech signal of the user), or may include both a speech signal of a user and an ambient sound signal. Correspondingly, the performing audio mixing processing on a first speech signal and the ambient sound signal based on amplitudes and phases of the first speech signal and the ambient sound signal and a location of the at least one external speech collector includes: performing audio mixing processing on the first speech signal and the ambient sound signal based on the amplitudes and the phases of the first speech signal and the ambient sound signal and locations of the at least one external speech collector and the ear canal speech collector. For example, when the location of the at least one external speech collector is a location 1, and an amplitude difference between the first speech signal and the ambient sound signal is less than an amplitude threshold, the amplitude of the ambient sound signal is increased to a preset amplitude threshold, and the output delay of the ambient sound signal is adjusted. For another example, when the location of the at least one external speech collector is a location 2, and a difference between moments corresponding to the adjacent amplitudes of the first speech signal and the ambient sound signal is less than a moment difference threshold, the ambient sound signal is widened and the output delay is set. In the possible implementation, the first speech signal is obtained by preprocessing the speech signal collected by the ear canal speech collector, so that when the target speech signal is played, the user can hear a clear and natural self-speech signal such as a call speech signal, thereby improving call quality.

In a possible implementation of the first aspect, the preprocessing a speech signal collected by the ear canal speech collector includes: performing at least one of the following processing on the speech signal collected by the ear canal speech collector: amplitude adjustment, gain enhancement, echo cancellation, or noise suppression. In the possible implementation, the speech signal collected by the ear canal speech collector may have a relatively small amplitude and a relatively low gain, and various noise signals such as an echo signal or ambient noise may also exist in the speech signal. The noise signal in the speech signal may be effectively reduced and a signal-to-noise ratio may be increased by performing at least one processing in amplitude adjustment, gain enhancement, echo cancellation, or noise suppression on the speech signal.

In a possible implementation of the first aspect, the ear canal speech collector includes at least one of an ear canal microphone or an ear bone line sensor. In the possible implementation, diversity and flexibility of using the ear canal speech collector are improved.

In a possible implementation of the first aspect, the preprocessing a speech signal collected by the at least one external speech collector includes: performing at least one of the following processing on the speech signal collected by the at least one external speech collector: amplitude adjustment, gain enhancement, echo cancellation, or noise suppression. In the possible implementation, the speech signal collected by the external speech collector may have a relatively small amplitude and a relatively low gain, and various noise signals such as an echo signal and ambient noise may also exist in the speech signal. The noise signal in the speech signal may be effectively reduced and a signal-to-noise ratio may be increased by performing at least one of the foregoing processing on the speech signal.

In a possible implementation of the first aspect, the method further includes: performing at least one of the following processing on the target speech signal and outputting a processed target speech signal, where the at least one processing includes noise suppression, equalization processing, data packet loss compensation, automatic gain control, or dynamic range adjustment. In the possible implementation, a new noise signal may be generated in a processing process of the speech signal, and a data packet loss may occur in a transmission process. A signal-to-noise ratio of the target speech signal may be effectively increased by performing at least one of the foregoing processing on the output target speech signal, thereby improving call quality and user experience.

In a possible implementation of the first aspect, the at least one external speech collector includes a call microphone or a noise reduction microphone.

In a possible implementation of the first aspect, when the earphone includes an ear canal microphone and a call microphone, the performing audio mixing processing on a first speech signal and the ambient sound signal based on amplitudes and phases of the first speech signal and the ambient sound signal and a location of the at least one external speech collector includes: determining, based on locations of the ear canal microphone and the call microphone and an amplitude difference and/or a phase difference of a same ambient sound signal collected by the ear canal microphone and the call microphone, a distance between a user and a sound source corresponding to the ambient sound signal; and further adjusting, based on the distance, at least one of the amplitude, the phase, or the output delay of the ambient sound signal and/or at least one of the amplitude, the phase, or the output delay of the first speech signal.

According to a second aspect, a technical solution of this application provides a speech signal processing apparatus. The apparatus includes at least one external speech collector, and further includes a processing unit, configured to preprocess a speech signal collected by the at least one external speech collector, to obtain an external speech signal. The preprocessing may specifically include related processing used to increase a signal-to-noise ratio of the external speech signal, such as noise reduction, amplitude adjustment, gain enhancement, or other processing. The processing unit is further configured to extract an ambient sound signal from the external speech signal, for example, extract a whistle sound, a broadcast sound, or a baby crying sound from the external speech signal. The processing unit is further configured to perform audio mixing processing on a first speech signal and the ambient sound signal based on amplitudes and phases of the first speech signal and the ambient sound signal and a location of the at least one external speech collector, to obtain a target speech signal. The first speech signal may be a to-be-played speech signal such as a song or a broadcast transmitted to the earphone by an electronic device connected to the earphone, or the first speech signal is a speech signal such as a call speech of a user collected by a microphone of the earphone.

In a possible implementation of the second aspect, the processing unit is specifically configured to: adjust at least one of the amplitude, the phase, or an output delay of the first speech signal; and/or adjust at least one of the amplitude, the phase, or an output delay of the ambient sound signal; and mix an adjusted first speech signal and an adjusted ambient sound signal into one speech signal.

In a possible implementation of the second aspect, the processing unit is further specifically configured to perform coherence processing on the external speech signal and a sample speech signal to obtain the ambient sound signal.

In a possible implementation of the second aspect, the at least one external speech collector includes at least two external speech collectors, and the processing unit is further specifically configured to perform coherence processing on external speech signals corresponding to the at least two external speech collectors, to obtain the ambient sound signal. The external speech signal corresponding to each external speech collector is an external speech signal obtained after a speech signal collected by the external speech collector is preprocessed. In a possible embodiment, the processing unit is specifically configured to: determine a power-spectrum density of the external speech signal, determine a power-spectrum density of the sample speech signal, and determine a cross-spectrum density between the external speech signal and the sample speech signal; determine a coherence coefficient between the external speech signal and the sample speech signal based on the power-spectrum density and the cross-spectrum density; and further determine the ambient sound signal based on the coherence coefficient. For example, a corresponding speech signal in the external speech signal when the coherence coefficient is equal to or close to 1 may be determined as the ambient sound signal.

In a possible implementation of the second aspect, the earphone further includes an ear canal speech collector, and the processing unit is further configured to preprocess a speech signal collected by the ear canal speech collector, to obtain the first speech signal. Correspondingly, the processing unit is further specifically configured to perform audio mixing processing on the first speech signal and the ambient sound signal based on the amplitudes and the phases of the first speech signal and the ambient sound signal and locations of the at least one external speech collector and the ear canal speech collector. For example, when the location of the at least one external speech collector is a location 1, and an amplitude difference between the first speech signal and the ambient sound signal is less than an amplitude threshold, the amplitude of the ambient sound signal is increased to a preset amplitude threshold, and the output delay of the ambient sound signal is adjusted. For another example, when the location of the at least one external speech collector is a location 2, and a difference between moments corresponding to the adjacent amplitudes of the first speech signal and the ambient sound signal is less than a moment difference threshold, the ambient sound signal is widened and the output delay is set.

In a possible implementation of the second aspect, the processing unit is further configured to perform at least one of the following processing on the speech signal collected by the ear canal speech collector: amplitude adjustment, gain enhancement, echo cancellation, or noise suppression.

In a possible implementation of the second aspect, the ear canal speech collector includes at least one of an ear canal microphone or an ear bone line sensor.

In a possible implementation of the second aspect, the processing unit is further configured to perform at least one of the following processing on the speech signal collected by the at least one external speech collector: amplitude adjustment, gain enhancement, echo cancellation, or noise suppression.

In a possible implementation of the second aspect, the processing unit is further configured to perform at least one of the following processing on the target speech signal and output a processed target speech signal, where the at least one processing includes noise suppression, equalization processing, data packet loss compensation, automatic gain control, or dynamic range adjustment.

In a possible implementation of the second aspect, the at least one external speech collector includes a call microphone or a noise reduction microphone.

In a possible implementation of the second aspect, when the apparatus includes an ear canal microphone and a call microphone, the processing unit is specifically configured to: determine, based on locations of the ear canal microphone and the call microphone and an amplitude difference and/or a phase difference of a same ambient sound signal collected by the ear canal microphone and the call microphone, a distance between a user and a sound source corresponding to the ambient sound signal; and further adjust, based on the distance, at least one of the amplitude, the phase, or the output delay of the ambient sound signal and/or at least one of the amplitude, the phase, or the output delay of the first speech signal.

In a possible implementation of the second aspect, the speech signal processing apparatus is an earphone. For example, the earphone may be a wireless earphone or a wired earphone. The wireless earphone may be a Bluetooth earphone, a WiFi earphone, an infrared earphone, or the like.

According to another aspect of the technical solutions of this application, a computer-readable storage medium is provided. The computer-readable storage medium stores instructions. When the instructions are run on a device, the device is enabled to perform the speech signal processing method provided in the first aspect or any possible implementation of the first aspect.

According to another aspect of the technical solutions of this application, a computer program product is provided. When the computer program product runs on a device, the device is enabled to perform the speech signal processing method provided in the first aspect or any possible implementation of the first aspect.

It can be understood that any of the apparatus of the speech signal processing method, computer storage medium, or computer program product provided above is used to perform the corresponding method provided above. Therefore, for beneficial effects of the apparatus, the computer storage medium, or the computer program product, refer to the beneficial effects in the corresponding method provided above. Details are not described herein again.

DESCRIPTION OF EMBODIMENTS

In the embodiments of this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists, and only B exists, where A and B may be singular or plural. The character "/" generally indicates an "or" relationship between the associated objects. "At least one of the following items" or expression similar to this refers to any combination of these items, including a singular item or any combination of plural items. For example, at least one of a, b, or c may represent a, b, c, a and b, a and c, b and c, or a, b, and c, where a, b, or c may be singular or plural. In addition, in the embodiments of this application, words such as "the first" and "the second" do not constitute a limitation on a quantity or an execution order.

It should be noted that, in the embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word "example" or "for example" or the like is intended to present a relative concept in a specific manner.

Figure 1:
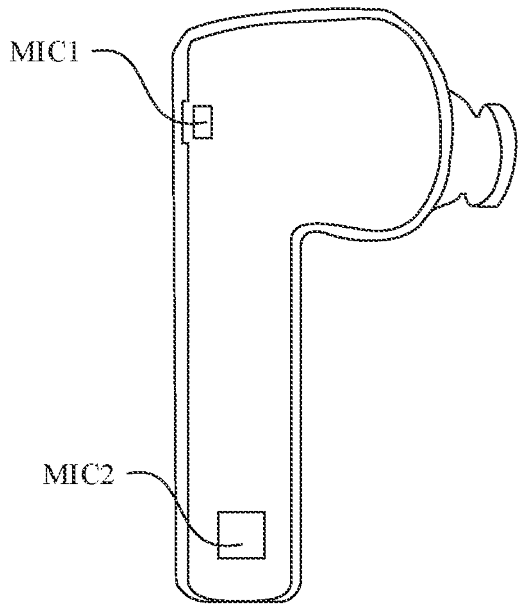
FIG. 1 is a schematic layout diagram of a microphone in an earphone.
Figure 2:
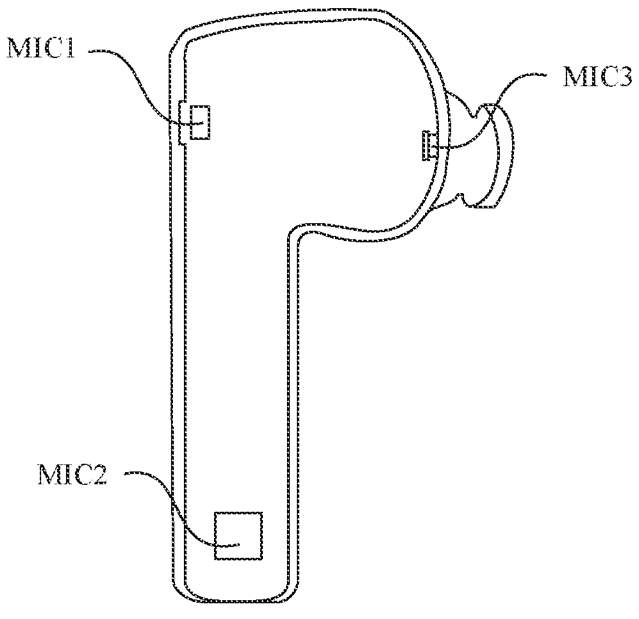
FIG. 2 is a schematic layout diagram of a speech collector in an earphone according to an embodiment of this application.

FIG. 2 is a schematic layout diagram of a speech collector in an earphone according to an embodiment of this application. At least two speech collectors may be disposed in the earphone, and each speech collector may be used to collect a speech signal. For example, each speech collector may be a microphone, a sound sensor, or the like. The at least two speech collectors may include an ear canal speech collector and an external speech collector. The ear canal speech collector may be a speech collector located inside an ear canal of a user when the user wears the earphone, and the external speech collector may be a speech collector located outside the ear canal of the user when the user wears the earphone.

The at least two speech collectors in FIG. 2 include three speech collectors, which are respectively represented as a MIC1, a MIC2, a MIC3 for description. The MIC1 and the MIC2 are external speech collectors. When the user wears the earphone, the MIC1 is close to an ear of the wearer, and the MIC2 is close to a mouth of the wearer. The MIC3 is an ear canal speech collector. When the user wears the earphone, the MIC3 is located inside the ear canal of the wearer. In actual application, the MIC1 may be a noise reduction microphone or a feedforward microphone, the MIC2 may be a call microphone, and the MIC3 may be an ear canal microphone or an ear bone line sensor.

The earphone may be used in cooperation with various electronic devices through wired connection or wireless connection, such as a mobile phone, a notebook computer, a computer, or a watch, to process audio services such as media and calls of the electronic devices. For example, the audio service may include playing, in a call service scenario such as a call, a WeChat speech message, an audio call, a video call, a game, or a speech assistant, speech data of a peer end to the user, or collecting speech data of the user and sending the speech data to the peer end, and may further include media services such as playing music, recording, a sound in a video file, background music in a game, and an incoming call prompt tone to the user. In a possible embodiment, the earphone may be a wireless earphone. The wireless earphone may be a Bluetooth earphone, a WiFi earphone, an infrared earphone, or the like. In another possible implemented embodiment, the earphone may be a flex-form earphone, an over-ear headphone, an in-ear earphone, or the like.

Further, the earphone may include a processing circuit and a speaker. The at least two speech collectors and the speaker are connected to the processing circuit. The processing circuit may be used to receive and process speech signals collected by the at least two speech collectors, for example, perform noise reduction processing on the speech signals collected by the speech collectors. The speaker may be used to receive audio data transmitted by the processing circuit, and play the audio data to the user. For example, the speaker plays speech data of a peer party to the user in a process in which the user makes or answers a call by using a mobile phone, or plays audio data on the mobile phone to the user. The processing circuit and the speaker are not shown in FIG. 2.

In some feasible embodiments, the processing circuit may include a central processing unit, a general purpose processor, a digital signal processor (digital signal processor, DSP), a microcontroller, a microprocessor, or the like. In addition, the processing circuit may further include another hardware circuit or accelerator, such as an application-specific integrated circuit, a field programmable gate array or another programmable logic device, a transistor logic device, a hardware component, or any combination thereof. The processing circuit may implement or execute various example logical blocks, modules, and circuits described with reference to content disclosed in this application. Alternatively, the processing circuit may be a combination of processors implementing a computing function, for example, a combination of one or more microprocessors, or a combination of a digital signal processor and a microprocessor.

Figure 3:
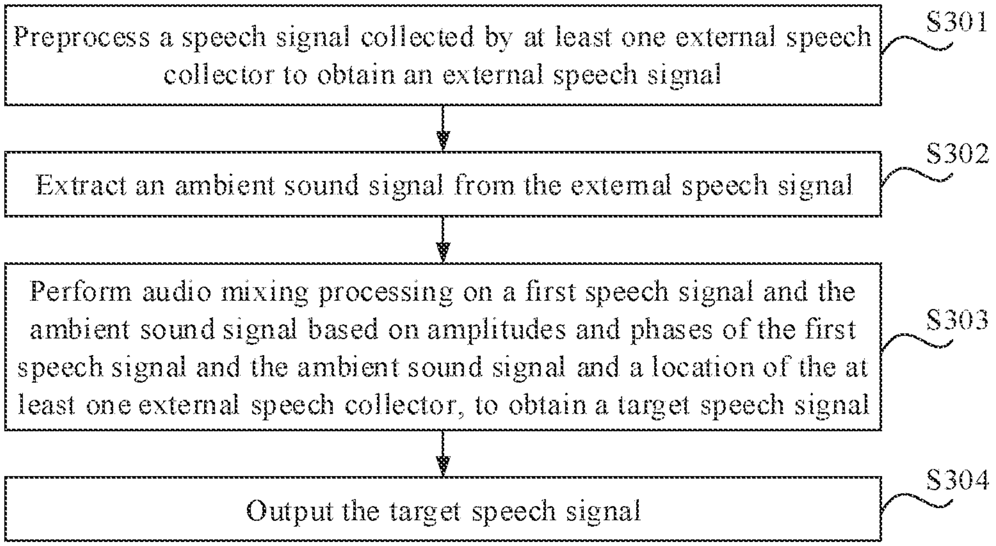
FIG. 3 is a schematic flowchart of a signal processing method according to an embodiment of this application.

FIG. 3 is a schematic flowchart of a speech signal processing method according to an embodiment of this application. The method may be applied to the earphone shown in FIG. 2, and may be specifically executed by the processing circuit in the earphone. Referring to FIG. 3, the method includes the following steps.

S301. Preprocess a speech signal collected by at least one external speech collector to obtain an external speech signal.

The at least one external speech collector may include one or more external speech collectors. When a user wears the earphone, the external speech collector is located outside an ear canal of the user. A speech signal outside the ear canal is featured with much interference and a wide frequency band. For example, the at least one external speech collector may include a call microphone. When the user wears the earphone, the call microphone is close to a mouth of the user, so as to collect a speech signal in an external environment.

When the user connects the earphone to an electronic device such as a mobile phone to play audio data such as music, a broadcast, or a call speech, the at least one external speech collector may collect a speech signal in an external environment. The collected speech signal is featured with large noise and a wide frequency band, and the frequency band may be a medium and high frequency band. For example, the frequency band may range from 100 Hz to 10 kHz. For example, when the user uses the earphone in an outdoor environment, the at least one external speech collector may collect a whistle sound, an alarm bell sound, a broadcast sound, a speaking sound of a surrounding person, or the like in the external environment. When the user uses the earphone in an indoor environment, the at least one external speech collector may collect a doorbell sound, a baby crying sound, a speaking sound of a surrounding person, or the like in the indoor environment.

Specifically, when the at least one external speech collector collects the speech signal, the at least one external speech collector may transmit the collected speech signal to the processing circuit, and the processing circuit preprocesses the speech signal to remove some noise signals, to obtain the external speech signal. For example, when the at least one external speech collector includes a call microphone, the microphone may transmit the collected speech signal to the processing circuit, and the processing circuit removes some noise signals from the speech signal.

In an implementation, there may include the following four separate processing manners for preprocessing the speech signal collected by the at least one external speech collector, and a combination of any two or more of the following four separate processing manners may also be used to preprocessing the speech signal collected by the at least one external speech collector. The four separate processing methods are separately introduced and described below.

In a first manner, amplitude adjustment processing is performed on the speech signal collected by the at least one external speech collector.

The performing amplitude adjustment processing on the speech signal collected by the at least one external speech collector may include increasing an amplitude of the speech signal or decreasing an amplitude of the speech signal. A signal-to-noise ratio of the speech signal may be increased by performing amplitude adjustment processing on the speech signal.

For example, when an amplitude of a speech signal in an external environment is relatively small, the amplitude of the speech signal collected by the at least one external speech collector is relatively small. In this case, the signal-to-noise ratio of the speech signal may be increased by increasing the amplitude of the speech signal, so that the amplitude of the speech signal can be effectively identified during subsequent processing.

In a second manner, gain enhancement processing is performed on the speech signal collected by the at least one external speech collector.

The performing gain enhancement processing on the speech signal collected by the at least one external speech collector may be amplifying the speech signal collected by the at least one external speech collector. A larger amplification multiple (that is, a larger gain) indicates a larger signal value of the speech signal. The speech signal may include a plurality of speech signals in an external environment. For example, the speech signal includes wind noise and a speech signal corresponding to a whistle sound, and the amplifying the speech signal means amplifying both the wind noise and the speech signal corresponding to the whistle sound.

For example, when a speech signal in an external environment is relatively weak, a gain of the speech signal collected by the at least one external speech collector is relatively small, and a relatively large error may be caused during subsequent processing. In this case, the gain of the speech signal may be increased by performing gain enhancement processing on the speech signal, so that a processing error of the speech signal can be effectively reduced during subsequent processing.

In a third manner, echo cancellation processing is performed on the speech signal collected by the at least one external speech collector.

In a process in which the user plays audio data by using the earphone, in addition to an external ambient sound signal, the speech signal collected by the at least one external speech collector may include an echo signal. The echo signal may refer to a sound that is generated by a speaker of the earphone and that is collected by the external speech collector. For example, in the process in which the user plays the audio data by using the earphone, when collecting the speech signal, the external speech collector of the earphone collects the audio data (that is, the echo signal) played by the speaker in addition to collecting a speech signal in an external environment. Therefore, the speech signal collected by the external speech collector includes the echo signal.

The performing echo cancellation processing on the speech signal collected by the at least one external speech collector may be cancelling the echo signal in the speech signal collected by the at least one external speech collector. For example, the echo signal may be cancelled by performing, by using an adaptive echo filter, filtering processing on the speech signal collected by the at least one external speech collector. The echo signal is a noise signal, and a signal-to-noise ratio of the speech signal can be increased by cancelling the echo signal, thereby improving quality of the audio data played by the earphone. For a specific implementation process of echo cancellation, refer to descriptions in a related technology for echo cancellation. This is not specifically limited in this embodiment of this application.

In a fourth manner, noise suppression is performed on the speech signal collected by the at least one external speech collector.

In a process in which the user plays audio data by using the earphone, if a plurality of ambient sounds exist in an environment in which the user is located, such as a whistle sound, wind noise, or a speaking sound of another person around the user, the speech signal collected by the at least one external speech collector may include a plurality of ambient sound signals. If a required ambient sound signal is a speech signal corresponding to a whistle sound, the performing noise suppression on the speech signal collected by the at least one external speech collector may be reducing or cancelling another ambient sound signal (which may be referred to as a noise signal or background noise) different from the required ambient sound signal. A signal-to-noise ratio of the speech signal collected by the at least one external speech collector may be increased by cancelling the noise signal. For example, the noise signal in the speech signal may be cancelled by performing filtering processing on the speech signal collected by the at least one external speech collector.

S302. Extract an ambient sound signal from the external speech signal.

The external speech signal may include one or more ambient sound signals, and the extracting the ambient sound signal from the external speech signal may be extracting a required ambient sound signal from the external speech signal. For example, the external speech signal includes a plurality of ambient sound signals such as a whistle sound and a wind sound. If the required ambient sound signal is a whistle sound, an ambient sound signal corresponding to the whistle sound may be extracted from the external speech signal. Specifically, in this application, there may include the following two different implementations for extracting the ambient sound signal from the external speech signal, as described below.

In Manner I, coherence processing is performed on the external speech signal and a sample speech signal to obtain the ambient sound signal.

The sample speech signal may be a speech signal stored inside the processing circuit, and the earphone may obtain the sample speech signal through pre-collection by using the external speech collector. For example, a whistle sound is played in advance in an environment with relatively low noise, the whistle sound is collected by using the earphone, and a series of processing such as noise reduction is performed on the collected speech signal, and processed speech signal is stored in the processing circuit in the earphone as the sample speech signal.

In addition, signal correlation may refer to synchronous similarity between two signals. For example, if there is a correlation between two signals, feature marks (for example, amplitudes, frequencies, or phases) of the two signals change synchronously in a specific time, and change laws are similar.

Correlation processing performed on two signals may be implemented by determining a coherence coefficient between the two signals. For any two signals x and y, the coherence coefficient is defined as a function of a power-spectrum density (power-spectrum density, PSD) and a cross-spectrum density (cross-spectrum density, CSD), and may be specifically determined by using the following formula (1). In the formula, $P_{xx}(W)$ and $P_{yy}(f)$ respectively represent PSDs of the signal x and the signal y, and $P_{xy}(f)$ represents the CSD between the signal x and the signal y. $Coh_{xy}$ represents a coherence coefficient between the signal x and the signal y at a frequency f. In the formula, $0 \le Coh_{xy} \le 1$. If $Coh_{xy}=0$, the signal x and the signal y are incoherent; or if $Coh_{xy}=1$, the signal x and the signal y are exactly coherent.

$$Coh^2_{xy}=|P_{xy}(f)|^2/(P_{xx}(f)\times P_{yy}(f)) \quad (1).$$

When the signal x and the signal y in formula (1) are respectively the external speech signal and the sample speech signal, coherence processing can be performed on the external speech signal and the sample speech signal.

When the processing circuit obtains the external speech signal, the processing circuit may perform coherence processing on the external speech signal by using the sample speech signal, so as to extract a speech signal in high coherence with the sample speech signal from the external speech signal (for example, the coherence coefficient is equal to or close to 1), that is, extract the ambient sound signal from the external speech signal. The sample speech signal is a pre-collected speech signal with a relatively high signal-to-noise ratio corresponding to an ambient sound, and the extracted ambient sound signal is in high coherence with the sample speech signal. Therefore, the extracted ambient sound signal and the sample speech signal are speech signals of the same ambient sound, and the extracted ambient sound signal has a high signal-to-noise ratio.

Specifically, that the external speech signal is represented as the signal x, and the sample speech signal is represented as the signal y is used as an example. The processing circuit may separately perform Fourier transform on the external speech signal x and the sample speech signal y, to obtain F(x) and F(y); multiply F(x) and F(y) to obtain the cross-spectrum density $P_{xy}(f)$ function of the external speech signal x and the sample speech signal y; perform conjugate multiplying on F(x) and F(x) to obtain the power-spectrum density $P_{xx}(f)$ of the external speech signal x; perform conjugate multiplying on F(y) and F(y) to obtain the power-spectrum density $P_{yy}(f)$ of the sample speech signal y; put $P_{xy}(f)$, $P_{xx}(f)$, and $P_{yy}(f)$ into formula (1) to obtain the coherence coefficient between the external speech signal x and the sample speech signal y; and further obtain an ambient sound signal with high similarity based on the coherence coefficient.

In Manner II, the at least one external speech collector includes at least two external speech collectors, and correlation processing is performed on external speech signals corresponding to the at least two external speech collectors to obtain the ambient sound signal.

The at least two external speech collectors may include two or more external speech collectors, and an external speech signal is obtained after a speech signal collected by each external speech collector is preprocessed. Therefore, the at least two external speech collectors correspondingly obtain at least two external speech signals. Because the at least two external speech collectors may perform collection in a same environment, the obtained at least two external speech signals each include an ambient sound signal corresponding to the same environment. The ambient sound signal may be obtained by performing correlation processing on the at least two external speech signals.

For example, that the at least two external speech collectors include a call microphone and a noise reduction microphone is used as an example. If a first external speech signal is obtained after a speech signal collected by the call microphone is preprocessed, and a second external speech signal is obtained after a speech signal collected by the noise reduction microphone is preprocessed, the processing circuit may perform correlation processing on the first external speech signal and the second external speech signal to obtain the ambient sound signal.

It should be noted that a specific process of processing correlation processing on the first external speech signal and the second external speech signal is similar to the specific processing of performing coherence processing on the external speech signal and the sample speech signal in Manner I. For details, refer to the descriptions in Manner I. Details are not described herein again in this embodiment of this application.

S303. Perform audio mixing processing on a first speech signal and the ambient sound signal based on amplitudes and phases of the first speech signal and the ambient sound signal and a location of the at least one external speech collector, to obtain a target speech signal.

The first speech signal may be a to-be-played speech signal. For example, the first speech signal may be a to-be-played speech signal of a song, a to-be-played speech signal of a peer party of a call, a to-be-played speech signal of a user, or a to-be-played speech signal of other audio data. In an implementation, the first speech signal may be transmitted to the processing circuit of the earphone by an electronic device connected to the earphone, or may be obtained by the earphone through collection by using another speech collector such as an ear canal speech collector.

Specifically, the performing audio mixing processing on the first speech signal and the ambient sound signal may include, adjusting at least one of the amplitude, the phase, or an output delay of the first speech signal; and/or adjusting at least one of the amplitude, the phase, or an output delay of the ambient sound signal; and mixing an adjusted first speech signal and an adjusted ambient sound signal into one speech signal.

In an implementation, the processing circuit may perform audio mixing processing on the first speech signal and the ambient sound signal based on a preset audio mixing rule. The audio mixing rule may be set by a person skilled in the art based on an actual situation, or may be obtained through speech data training. A specific audio mixing rule is not specifically limited in this embodiment of this application.

For example, when the location of the at least one external speech collector is a location 1, and an amplitude difference between the first speech signal and the ambient sound signal is less than an amplitude threshold, the amplitude of the ambient sound signal may be increased to a preset amplitude threshold, or the output delay of the ambient sound signal may be adjusted, so that the ambient sound signal is prominent in the target speech signal obtained through mixing. In this way, when the ambient sound signal is a whistle sound, the amplitude and the output delay of the ambient sound signal are adjusted, so that the user can clearly hear the whistle sound when the target speech signal is played, thereby improving security of the user in an outdoor environment.

For another example, when the location of the at least one external speech collector is a location 2, and a difference between moments corresponding to the adjacent amplitudes of the first speech signal and the ambient sound signal is less than a moment difference threshold, the ambient sound signal may be widened and the output delay may be set, so as to present, in a stereo form, the ambient sound signal in the target speech signal obtained through mixing. In this way, when the ambient sound signal is a crying sound of an indoor baby or a speaking sound of a person, the ambient sound signal is presented in a stereo form, so that the user can clearly hear the crying sound of the baby or the speaking sound of the person at a first time, so as to avoid inconvenience caused when the user needs to take off the earphone to listen to a sound of the indoor baby or needs to take off the earphone to talk to a family member.

Figure 4:
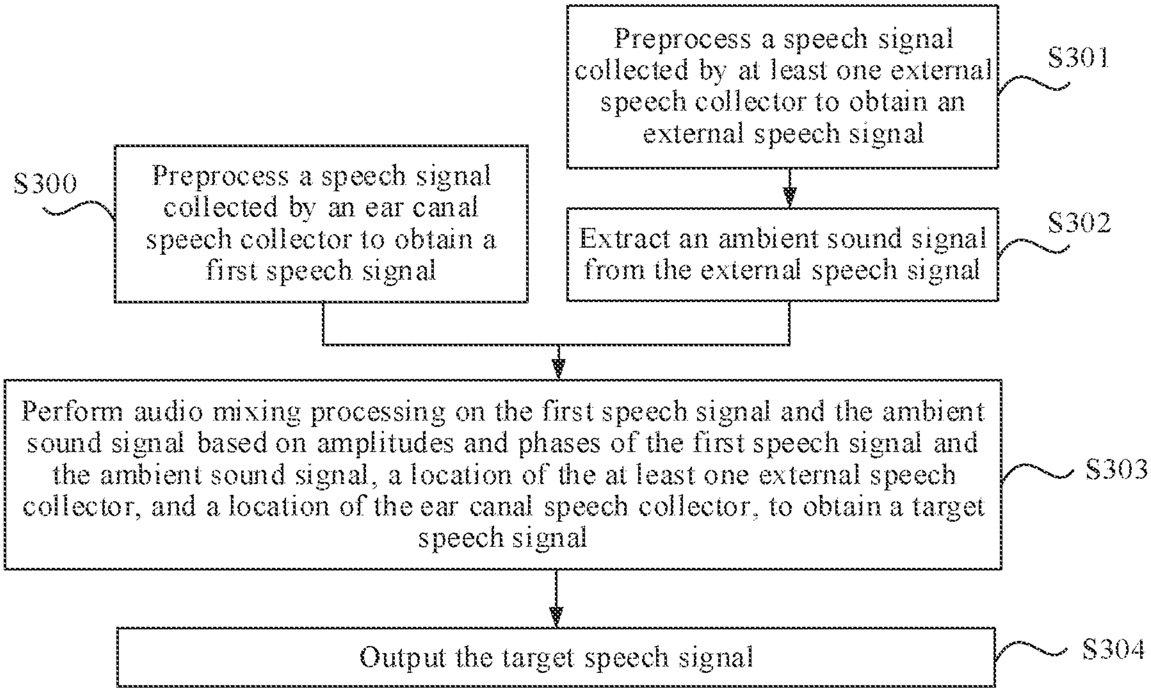
FIG. 4 is a schematic flowchart of another signal processing method according to an embodiment of this application.

Optionally, the earphone further includes an ear canal speech collector. When the first speech signal is collected by another speech collector such as the ear canal speech collector, as shown in FIG. 4, the method further includes S300. There may be no sequence between S300 and S301-S302 may be performed in any sequence. In FIG. 4, an example in which S300 and S301-S302 are performed in parallel is used for description.

S300. Preprocess a speech signal collected by the ear canal speech collector, to obtain the first speech signal.

The ear canal speech collector may be an ear canal microphone or an ear bone line sensor. When the user wears the earphone, the ear canal speech collector is located inside an ear canal of the user. A speech signal inside the ear canal is featured with less interference and a narrow frequency band. When the user connects the earphone to an electronic device such as a mobile phone to make or answer a call or play audio data, the ear canal speech collector may collect the speech signal inside the ear canal. The collected speech signal has small noise and a narrow frequency band. The frequency band may be a low and medium frequency band, for example, the frequency band may range from 100 Hz to 4 kHz, or range from 200 Hz to 5 kHz, or the like.

When the ear canal speech collector collects the speech signal, the ear canal speech collector may transmit the speech signal to the processing circuit, and the processing circuit preprocesses the speech signal. For example, the processing circuit performs single-channel noise reduction on the speech signal collected by the ear canal speech collector, to obtain the first speech signal. The first speech signal is a speech signal obtained after noise is removed from the speech signal collected by the ear canal speech collector. For example, when the user connects the earphone to an electronic device such as a mobile phone to make or answer a call, the first speech signal obtained after single-channel noise reduction is performed on the speech signal collected by the ear canal speech collector may include a call speech signal or a self-speech signal of the user. In an implementation, the first speech signal may further include an ambient sound signal, and the ambient sound signal and the ambient sound signal in S303 come from a same sound source.

Specifically, the preprocessing a speech signal collected by the ear canal speech collector may include performing at least one of the following processing on the speech signal collected by the ear canal speech collector: amplitude adjustment, gain enhancement, echo cancellation, or noise suppression. To be specific, the method for preprocessing the speech signal collected by the ear canal speech collector is similar to the method for preprocessing the speech signal collected by the at least one external speech collector described in S301, that is, the four separate processing manners described in S301 may be used, or a combination of any two or more of the four separate processing manners may be used. For a specific process, refer to related descriptions in S301. Details are not described herein again in this embodiment of this application.

Correspondingly, when the first speech signal is collected by the ear canal speech collector, S303 may be specifically as follows: Audio mixing processing is performed on the first speech signal and the ambient sound signal based on the amplitudes and the phases of the first speech signal and the ambient sound signal, the location of the at least one external speech collector, and a location of the ear canal speech collector, to obtain the target speech signal. In an implementation, a distance between a user and a sound source corresponding to the ambient sound signal is obtained based on the location of the external speech collector and the location of the ear canal speech collector, and an amplitude difference and/or a phase difference of a same ambient sound signal collected by the ear canal speech collector and the external speech collector; at least one of the amplitude, the phase, or the output delay of the ambient sound signal may be further adjusted based on the distance, and/or at least one of the amplitude, the phase, or the output delay of the first speech signal may be further adjusted based on the distance; and an adjusted first speech signal and an adjusted ambient sound signal are mixed into one speech signal to obtain the target speech signal.

S304. Output the target speech signal.

When obtaining the target speech signal, the processing circuit may output the target speech signal. For example, the processing circuit may transmit the target speech signal to a speaker of the earphone to play the target speech signal. The target speech signal is obtained by mixing the adjusted first speech signal and the adjusted ambient sound signal. Therefore, when the user wears and uses the earphone, the user can hear a clear and natural first speech signal and ambient sound signal in an external environment. In addition, because the ambient sound signal in the target speech signal is an adjusted signal, the ambient sound signal heard by the user does not cause discomfort such as harshness or inaudibility, thereby improving speech signal quality and user experience.

In an implementation, before outputting the target speech signal, the processing circuit may further perform other processing on the target speech signal to further improve a signal-to-noise ratio of the target speech signal. Specifically, the processing circuit may perform at least one of the following processing on the target speech signal: noise suppression, equalization processing, data packet loss compensation, automatic gain control, or dynamic range adjustment.

A new noise signal may be generated in a processing process of the speech signal. For example, new noise is generated in a noise reduction process and/or a coherence processing process of the speech signal, that is, the target speech signal includes a noise signal. The noise signal in the target speech signal may be reduced or cancelled by performing noise suppression processing, thereby improving the signal-to-noise ratio of the target speech signal.

A data packet loss may occur in a transmission process of the speech signal. For example, a packet loss occurs in a process of transmitting the speech signal from the speech collector to the processing circuit. As a result, a packet loss problem may exist in a data packet corresponding to the target speech signal, and call quality is affected when the target speech signal is output. The packet loss problem may be resolved by performing data packet loss compensation processing, thereby improving call quality when the target speech signal is output.

A gain of the target speech signal obtained by the processing circuit may be relatively large or relatively small, and call quality is affected when the target speech signal is output. The gain of the target speech signal may be adjusted to an appropriate range by performing automatic gain control processing and/or dynamic range adjustment on the target speech signal, thereby improving quality of playing the target speech and user experience.

The foregoing mainly describes the solutions provided in the embodiments of this application from a perspective of the earphone. It may be understood that, to implement the foregoing functions, the earphone includes a corresponding hardware structure and/or software module for performing each of the functions. A person of ordinary skill in the art should easily be aware that, in combination with the examples described in the embodiments disclosed in this specification, steps can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the earphone may be divided into functional modules based on the foregoing method examples. For example, each functional module may be obtained through division based on each function, or two or more functions may be integrated into one processing module. The integrated module may be implemented in a form of hardware, or may be implemented in a form of a software functional module. It should be noted that, module division in the embodiments of this application is an example, and is merely a logical function division. In actual implementation, another division manner may be used.

Figure 5:
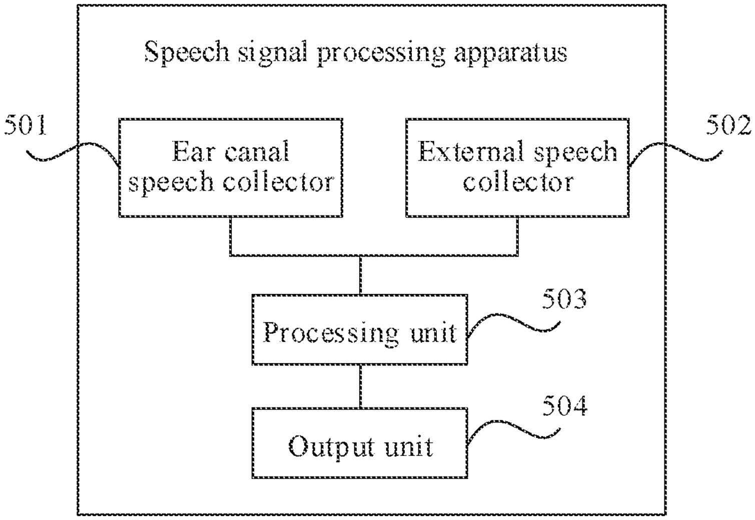
FIG. 5 is a schematic structural diagram of a speech signal processing apparatus according to an embodiment of this application.

When functional modules are obtained through division based on corresponding functions, FIG. 5 is a possible schematic structural diagram of a speech signal processing apparatus in the foregoing embodiment. Referring to FIG. 5, the apparatus includes at least one external speech collector 502, and the apparatus further includes a processing unit 503 and an output unit 504. In actual application, the processing unit 503 may be a DSP, a microprocessing circuit, an application-specific integrated circuit, a field programmable gate array or another programmable logic device, a transistor logic device, a hardware component, or any combination thereof. The output unit 504 may be an output interface, a communications interface, a speaker, or the like. Further, the apparatus may include an ear canal speech collector 501.

In this embodiment of this application, the processing unit 503 is configured to preprocess a speech signal collected by the at least one external speech collector 502 to obtain an external speech signal. The processing unit 503 is further configured to extract an ambient sound signal from the external speech signal. The processing unit 503 is further configured to perform audio mixing processing on a first speech signal and the ambient sound signal based on amplitudes and phases of the first speech signal and the ambient sound signal and a location of the at least one external speech collector, to obtain a target speech signal. Optionally, the output unit 504 is configured to output the target speech signal.

In a possible implementation, the processing unit 503 is specifically configured to: adjust at least one of the amplitude, the phase, or an output delay of the first speech signal, and/or adjust at least one of the amplitude, the phase, or an output delay of the ambient sound signal, and mix an adjusted first speech signal and an adjusted ambient sound signal into one speech signal.

In an implementation, the processing unit 503 is further specifically configured to: perform coherence processing on the external speech signal and a sample speech signal to obtain the ambient sound signal. Alternatively, the at least one external speech collector includes at least two external speech collectors, and the processing unit 503 is further specifically configured to perform coherence processing on external speech signals corresponding to the at least two external speech collectors, to obtain the ambient sound signal.

In another possible implementation, the processing unit 503 is further configured to preprocess a speech signal collected by the ear canal speech collector, to obtain the first speech signal. For example, the processing unit 503 performs at least one of the following processing on the speech signal collected by the ear canal speech collector: amplitude adjustment, gain enhancement, echo cancellation, or noise suppression.

In an implementation, the processing unit 503 is further specifically configured to perform at least one of the following processing on the speech signal collected by the at least one external speech collector: amplitude adjustment, gain enhancement, echo cancellation, or noise suppression.

Further, the processing unit 503 is further configured to perform at least one of the following processing on the output target speech signal: noise suppression, equalization processing, data packet loss compensation, automatic gain control, or dynamic range adjustment.

In a possible implementation, the ear canal speech collector 501 includes an ear canal microphone or an ear bone line sensor. The at least one external speech collector 502 includes a call microphone or a noise reduction microphone.

Figure 6:
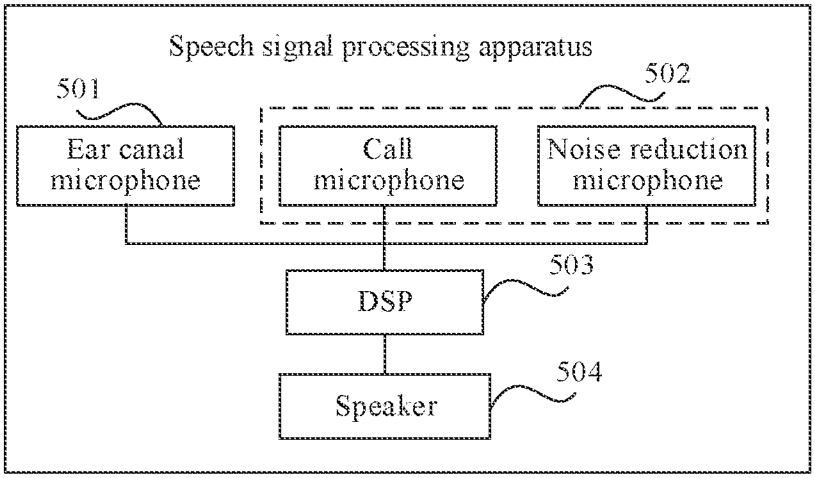
FIG. 6 is a schematic structural diagram of another speech signal processing apparatus according to an embodiment of this application.

For example, FIG. 6 is a schematic structural diagram of a speech signal processing apparatus according to an embodiment of this application. In FIG. 6, an example in which the ear canal speech collector 501 is an ear canal microphone, the at least one external speech collector 502 includes a call microphone and a noise reduction microphone, the processing circuit 503 is a DSP, and the output unit 504 is a speaker is used for description.

In this embodiment of this application, when a user wears the earphone, the external speech collector 502 is located outside an ear canal of the user, so that the external speech signal can be obtained by preprocessing the speech signal collected by the at least one external speech collector. A required ambient sound signal may be obtained by extracting the ambient sound signal from the external speech signal, and audio mixing processing is performed on the first speech signal and the ambient sound signal to obtain the target speech signal. Therefore, when the target speech signal is played, the user may hear a clear and natural first speech signal and important ambient sound signal in an external environment, thereby implementing monitoring of an ambient sound, and improving a monitoring effect and user experience.

In another embodiment of this application, a computer-readable storage medium is further provided. The computer-readable storage medium stores instructions. When the instructions are run on a device (which may be a single-chip microcomputer, a chip, a processing circuit, or the like), the device is enabled to perform the speech signal processing method provided above. The computer-readable storage medium may include any medium that can store program code, such as a USB flash drive, a removable hard disk, a read-only memory, a random access memory, a magnetic disk, or an optical disc.

In another embodiment of this application, a computer program product is further provided. The computer program product includes instructions, and the instructions are stored in a computer-readable storage medium. When the instructions are run on a device (which may be a single-chip microcomputer, a chip, a processing circuit, or the like), the device is enabled to perform the speech signal processing method provided above. The computer-readable storage medium may include any medium that can store program code, such as a USB flash drive, a removable hard disk, a read-only memory, a random access memory, a magnetic disk, or an optical disc.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A speech signal processing method, applied to an earphone, wherein the earphone comprises at least one external speech collector, and the method comprises:

preprocessing a speech signal collected by the at least one external speech collector, to obtain at least two external speech signals;

extracting an ambient sound signal based on performing correlation processing of the at least two external speech signals; and performing audio mixing processing on a first speech signal and the ambient sound signal based on amplitudes and phases of the first speech signal and the ambient sound signal and a location of the at least one external speech collector, to obtain a target speech signal.

2. The method according to claim 1, wherein the performing audio mixing processing on the first speech signal and the ambient sound signal comprises:

adjusting at least one of an amplitude, a phase, or an output delay of the first speech signal;

mixing an adjusted first speech signal and an adjusted ambient sound signal into one speech signal; or adjusting the at least one of the amplitude, the phase, or the output delay of the ambient sound signal; and mixing an adjusted first speech signal and an adjusted ambient sound signal into one speech signal.

3. The method according to claim 1 wherein the extracting an ambient sound signal based on performing correlation processing of the at least two external speech signals comprises:

performing coherence processing on an external speech signal and a sample speech signal to obtain the ambient sound signal.

4. The method according to claim 1, wherein the at least one external speech collector comprises at least two external speech collectors corresponding to the at least two external speech signals, and wherein an external speech signal corresponding to each external speech collector is the external speech signal obtained after a speech signal collected by the at least one external speech collector is preprocessed.

5. The method according to claim 1, wherein the earphone further comprises an ear canal speech collector, and the method further comprises:

preprocessing a speech signal collected by the ear canal speech collector, to obtain the first speech signal; and correspondingly, the performing audio mixing processing on the first speech signal and the ambient sound signal based on amplitudes and phases of the first speech signal and the ambient sound signal and a location of the at least one external speech collector comprises:

performing audio mixing processing on the first speech signal and the ambient sound signal based on the amplitudes and the phases of the first speech signal and the ambient sound signal and locations of the at least one external speech collector and the ear canal speech collector.

6. The method according to claim 5, wherein the preprocessing the speech signal collected by the ear canal speech collector comprises:

performing at least one of the following processing on the speech signal collected by the ear canal speech collector: amplitude adjustment, gain enhancement, echo cancellation, or noise suppression.

7. The method according to claim 6, wherein the ear canal speech collector comprises at least one of an ear canal microphone or an ear bone line sensor.

8. Method according to claim 1, wherein the preprocessing the speech signal collected by the at least one external speech collector comprises:

performing at least one of the following processing on the speech signal collected by the at least one external speech collector: amplitude adjustment, gain enhancement, echo cancellation, or noise suppression.

9. The method according to claim 1, wherein the method further comprises:

performing at least one of the following processing on the target speech signal and outputting a processed target speech signal, wherein the at least one processing comprises noise suppression, equalization processing, data packet loss compensation, automatic gain control, or dynamic range adjustment.

10. The method according to claim 1, wherein the at least one external speech collector comprises a call microphone or a noise reduction microphone.

11. A signal processing apparatus, wherein the signal processing apparatus comprises at least one external speech collector and a processing circuit, wherein the processing circuit is enabled to perform the following steps:

preprocessing a speech signal collected by the at least one external speech collector, to obtain at least two external speech signals;

extracting an ambient sound signal based on performing correlation processing of the at least two external speech signals; and performing audio mixing processing on a first speech signal and the ambient sound signal based on amplitudes and phases of the first speech signal and the ambient sound signal and a location of the at least one external speech collector, to obtain a target speech signal.

12. The signal processing apparatus according to claim 11, wherein the performing audio mixing processing on a first speech signal and the ambient sound signal comprises:

adjusting at least one of an amplitude, a phase, or an output delay of the first speech signal;

mixing an adjusted first speech signal and an adjusted ambient sound signal into one speech signal; or adjusting the at least one of the amplitude, the phase, or the output delay of the ambient sound signal; and mixing an adjusted first speech signal and an adjusted ambient sound signal into one speech signal.

13. The signal processing apparatus according to claim 11, wherein the extracting an ambient sound signal based on performing correlation processing of the at least two external speech signals comprises:

performing coherence processing on an external speech signal and a sample speech signal to obtain the ambient sound signal.

14. The signal processing apparatus according to claim 11, wherein the at least one external speech collector comprises at least two external speech collectors corresponding to the at least two external speech signals, and wherein an external speech signal corresponding to each external speech collector is the external speech signal obtained after a speech signal collected by the at least one external speech collector is preprocessed.

15. The signal processing apparatus according to claim 11, wherein the signal processing apparatus further comprises an ear canal speech collector, and the steps further comprises:

preprocessing a speech signal collected by the ear canal speech collector, to obtain the first speech signal; and correspondingly, the performing audio mixing processing on the first speech signal and the ambient sound signal based on amplitudes and phases of the first speech signal and the ambient sound signal and a location of the at least one external speech collector comprises:

performing audio mixing processing on the first speech signal and the ambient sound signal based on the amplitudes and the phases of the first speech signal and the ambient sound signal and locations of the at least one external speech collector and the ear canal speech collector.

16. The signal processing apparatus according to claim 15, wherein the preprocessing the speech signal collected by the ear canal speech collector comprises:

performing at least one of the following processing on the speech signal collected by the ear canal speech collector: amplitude adjustment, gain enhancement, echo cancellation, or noise suppression.

17. The signal processing apparatus according to claim 16, wherein the ear canal speech collector comprises at least one of an ear canal microphone or an ear bone line sensor.

18. The signal processing apparatus according to claim 11, wherein the preprocessing the speech signal collected by the at least one external speech collector comprises:

performing at least one of the following processing on the speech signal collected by the at least one external speech collector: amplitude adjustment, gain enhancement, echo cancellation, or noise suppression.

19. The signal processing apparatus according to claim 11, wherein the steps further comprises:

performing at least one of the following processing on the target speech signal and outputting a processed target speech signal, wherein the at least one processing comprises noise suppression, equalization processing, data packet loss compensation, automatic gain control, or dynamic range adjustment.

20. The signal processing apparatus according to claim 11, wherein the at least one external speech collector comprises a call microphone or a noise reduction microphone.

* * * * *